United States Patent [19]

Owen et al.

[11] Patent Number: 4,775,791
[45] Date of Patent: Oct. 4, 1988

[54] TRANSPARENT SHEET LIGHT COLLECTOR FOR PHOTOSTIMULABLE PHOSPHOR IMAGING

[75] Inventors: James F. Owen, Rochester; Anthony R. Lubinsky, Webster; Robert W. Kulpinski, Rochester; Yali E. Chan, Rochester; John C. Boutet, Rochester, all of N.Y.

[73] Assignee: Eastman Kodak Company, Rochester, N.Y.

[21] Appl. No.: 48,152

[22] Filed: May 11, 1987

[51] Int. Cl.$^4$ .................. G01N 23/04; G11B 7/135
[52] U.S. Cl. .................. 250/327.2; 250/578; 358/294
[58] Field of Search .......... 250/327.2, 484.1, 578, 250/228, 227; 358/200, 199, 294, 293, 285, 901

[56] References Cited

U.S. PATENT DOCUMENTS

| | | | |
|---|---|---|---|
| Re. 31,847 | 3/1985 | Luckey | 250/327.2 |
| 4,346,295 | 8/1982 | Tanaka et al. | 250/327.2 |
| 4,582,988 | 4/1986 | Aagano | 250/327.2 |
| 4,616,129 | 10/1986 | Yamada et al. | 250/207 |
| 4,623,937 | 11/1986 | Watanabe | 358/285 |

Primary Examiner—Janice A. Howell
Assistant Examiner—Constantine Hannaher
Attorney, Agent, or Firm—Thomas H. Close

[57] ABSTRACT

A light collector for collecting and detecting emitted light from a raster scanned photostimulable phosphor sheet in a photostimulable phosphor imaging apparatus includes a generally rectangular slab of transparent material having a thickness greater than 20 mm, a first face of said slab being arranged along the scan line of the photostimulable phosphor, said first face making an angle $\theta$ of between 10° and 15° with respect to a perpendicular to the surface of the stimulable phosphor sheet, and a plurality of photomultiplier tubes being arranged at an opposite face of the slab. An elongated mirror is arranged opposite first face for directing light emitted from the phosphor onto said first face of said slab of transparent material.

4 Claims, 4 Drawing Sheets

TRANSPARENT SHEET LIGHT COLLECTOR FOR PHOTOSTIMULABLE PHOSPHOR IMAGING

TECHNICAL FIELD

The invention relates to apparatus for reading out the image stored in a photostimulable phosphor image recording medium, and more particularly to apparatus for collecting and detecting the radiation emitted from the photostimulable phosphor in response to interrogation by stimulating radiation.

Reference is hereby made to copending U.S. patent application Ser. No. 917,935 filed Oct. 14, 1986 in the name of Y. Ellen Chan et al.

BACKGROUND ART

In a photostimulable phosphor imaging system, as described in U.S. Pat. No. Re. 31,847 reissued Mar. 12, 1985 to Luckey, a photostimulable phosphor sheet is exposed to an imagewise pattern of short wavelength radiation, such as x-radiation, to record a latent image pattern in the photostimulable phosphor sheet. The latent image is read out, by stimulating the phosphor with a relatively long wavelength stimulating radiation, such as red or infrared light. Upon stimulation, the photostimulable phosphor releases emitted radiation of an intermediate wavelength, such as blue or violet light, in proportion to the quantity of short wavelength radiation that was received. To produce a signal useful in electronic image processing, the photostimulable phosphor sheet is scanned in a raster pattern by a beam of light produced for example by a laser deflected by an oscillating or rotating scanning mirror, and the emitted radiation is sensed by a photodetector such as a photomultiplier tube to produce the electronic image signal.

In one type of scanning apparatus, the photostimulable phosphor sheet is placed on a translation stage, and is translated in a page scan direction past a laser beam that is repeatedly deflected in a line scan direction to form the scanning raster.

To optimize the signal-to-noise ratio (S/N) of the imaging system, it is desirable to collect as much of the emitted light as possible and to direct it to the photodetector. While the apparatus employed to collect the light may take various forms, one form of light collector is proposed in U.S. Pat. No. 4,616,129, issued Oct. 7, 1986, to Yamada et al. The light collector proposed by Yamada et al comprises a slab of light transmitting material 20-30 mm thick. One face of the slab is positioned adjacent the scan line to collect emitted light. An array of rectangular faced photomultiplier tubes are arranged along an opposite face to receive the collected light.

Experiments have identified a factor that limits the signal-to-noise ratio achievable with the photostimulable phosphor imaging apparatus. As the photostimulable phosphor sheet is scanned by the stimulating radiation beam, a high percentage (up to 90%) of the stimulating radiation is reflected from the photostimulable phosphor. When this reflected stimulating radiation is further reflected back on to the surface of the photostimulable phosphor, in a location away from the instantaneous scanning point, it is called flare and the phosphor will be stimulated to emit in these other locations. Flare induced emission which is collected by the light collector gives rise to a spurious background signal. Such reflection of the stimulating radiation onto the photostimulable phosphor may occur from the light collecting face of the light guide described above. Examples of the image degradation caused by flare include a reduction in the contrast of images due to flare induced emission from high exposure areas, which adds unwanted signal to low exposure areas. Shadow artifacts are produced in the image when a high exposure object on a low exposure background field is scanned. The signal-to-noise radio in all image areas is degraded. Lase noise is enhanced since a large area of the phosphor is exposed to a low level of stimulating radiation, the light emitted from this area will follow the fluctuations in laser power, thereby amplifying the effect of the laser noise.

It is therefore the object of the present invention to provide an improved light collector having reduced flare.

DISCLOSURE OF THE INVENTION

The objects of the present invention are achieved by providing a light collector having a generally rectangular slab of transparent material with a thickness of greater than 20 mm, a first face of said sheet of transparent material being arranged adjacent the scan line on the photostimulable phosphor sheet and the first face making an angle $\theta$ between 10° and 15° with respect to the normal to the surface of the stimulable phosphor sheet. A plurality of photomultiplier tubes are arranged in optical contact with an opposite face of the first face of the slab of transparent material. An elongated mirror is arranged opposite the first face for directing light emitted from the phosphor sheet onto the first face of the slab of transparent material.

MODES OF CARRYING OUT THE INVENTION

Figure 1:
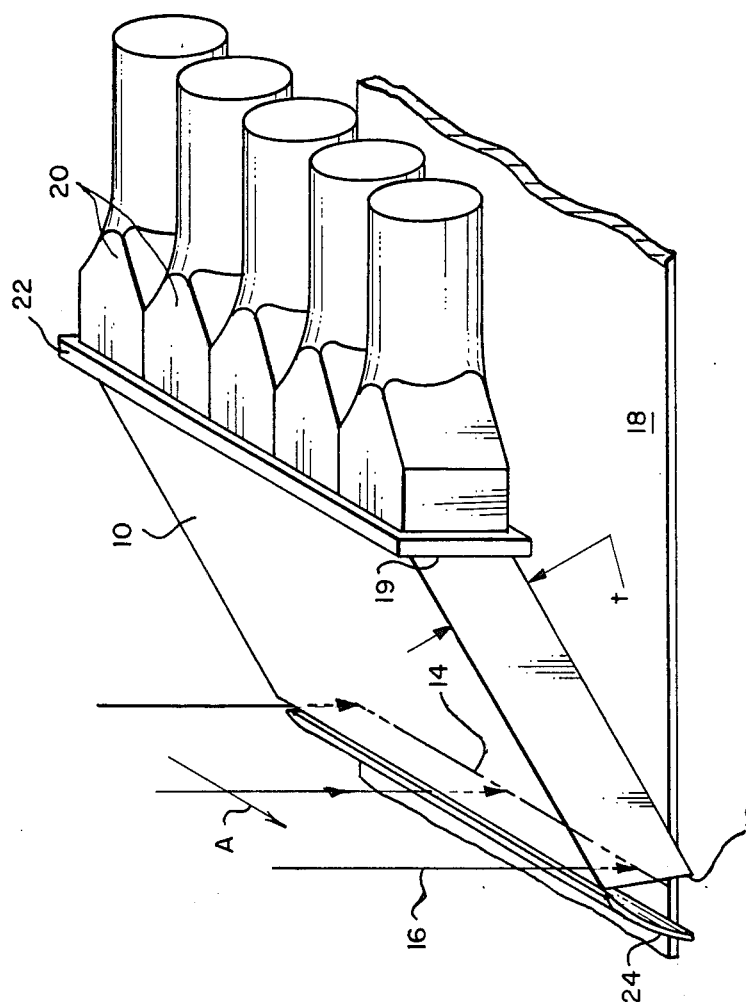
FIG. 1 is a perspective view of a light collector according to the present invention.

Turning now to FIG. 1, a light collector according to the present invention will be described. The light collector includes generally a rectangular slab of transparent material 10, having a thickness t greater than 20 mm. A light-receiving face 12 of the slab 10 is arranged adjacent to the scan line 14 of a laser beam 16 that moves in the direction of arrow A to scan a photostimulable phosphor sheet 18. At an opposite face 19 of the slab 10 are arranged a plurality of photomultiplier tubes 20 in optical contact with the face 19 of the slab. The photomultipler tubes 20 are provided with rectangular light receiving faces so that they can be closely spaced along the face 19 of the slab. A filter 22 which transmits at the emitted wavelength, and does not transmit at the stimulating wavelength, is located between the light receiving faces of photomultiplier tubes, and the transparent slab 10, and in optical contact therewith. An elongated reflector 24 is positioned opposite the light receiving face 12 of the transparent slab 10 to reflect emitted ligth into the light receiving face 12.

Figure 2:
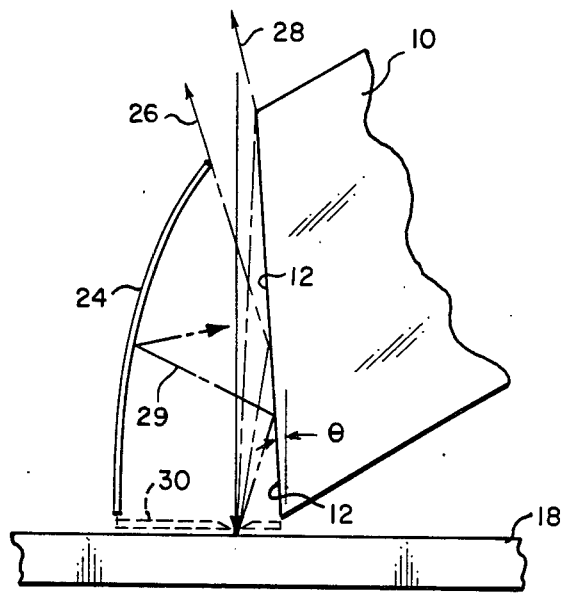
FIGS. 2a–c are partical side views of a light collector shown in FIG. 1 illustrating the effects on the angle $\theta$ of the front face of a light collector.
Figure 2:
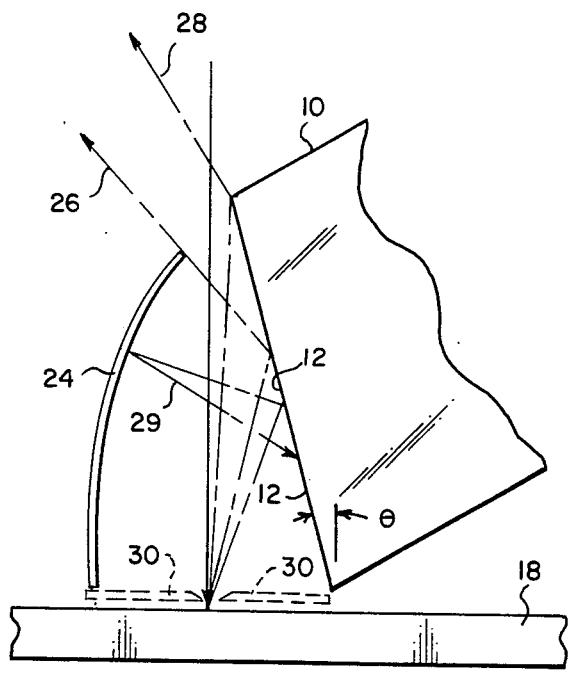
Figure 2:
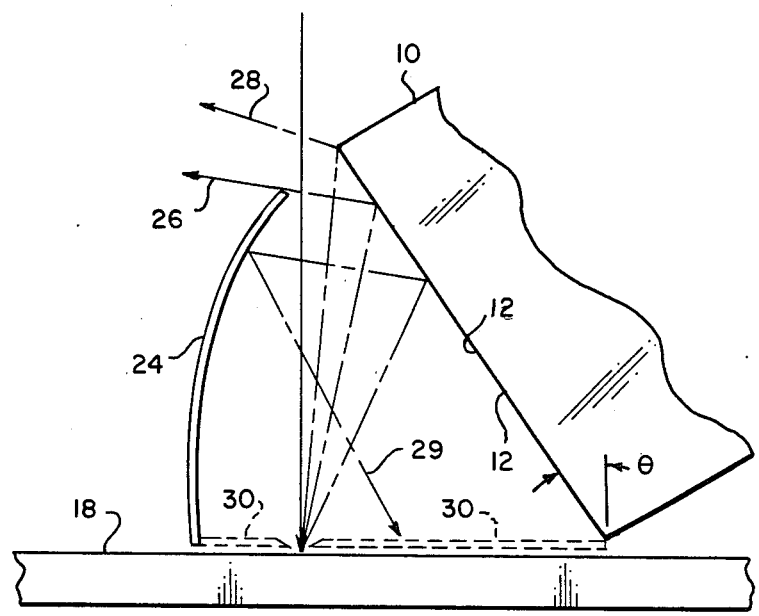

According to the present invention, the light receiving face 12 of the slab 10 is arranged at an angle between 10° and 15° from a perpendicular to the surface of the phosphor. FIG. 2a illustrates some ray paths when the face is at about 4° from the perpendicular. As shown by the rays 26 and 28, a large percentage of the emitted light reaching the light receiving face 12 of the slab 10 is reflected becasue of the grazing angle of incidence on the nearly vertical face. This reflected light escapes through the scan slot between the top of mirror 24 and the transparent light collector. As the angle $\theta$ is increased as shown in FIG. 2b, where $\theta$ equals 13°, less light is reflected from the light receiving face of the slab and lost through the top slot as shown by the rays 26 and 28, or partially absorbed during reflection from mirror 24 as shown by ray 29 thereby improving the collection efficiency of the light collector. As the angle $\theta$ increases, the intensities of rays 26, 28 and 29 decrease due to the larger grazing angle of reflection, and hence a greater percentage of the light enters the collector rather than being reflected from face 12. Most of the rays reflected off the light receiving face 12 of the slab 10 return form a second time to the face of the slab as shown by ray 29. Further increase in the angle $\theta$, as shown in FIG. 2c where $\theta$ equals 36°, do not produce significant improvements in reflection losses, however most rays reflected from the light receiving face of the slab are reflected directly to the surface of the phosphor, as shown by ray 29, thereby reducing collection efficiency. Since reflected rays of stimulating light are also returned more directly to the surface of the stimulable phosphor sheet, flare induced emission from the stimulable phosphor is also increased.

Figure 3:
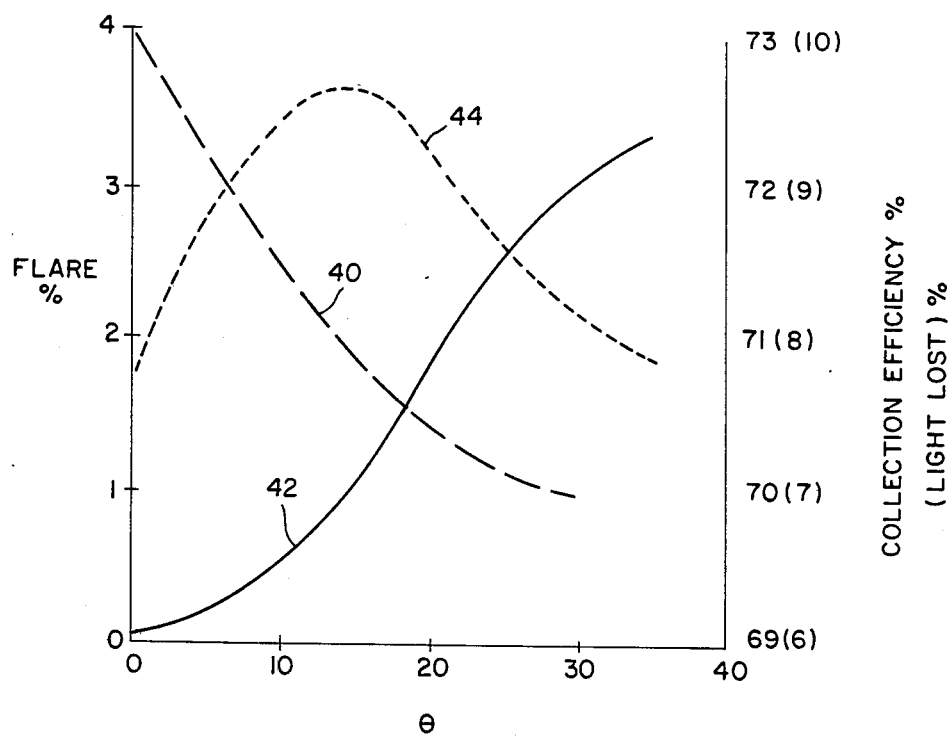
FIG. 3 is a graph showing the effects of the angle $\theta$ on a light collection efficiency and flare.

FIG. 3 is a graph showing the effect of the angle $\theta$ on (1) emitted light loss (dashed line 40), (2) flare (solid line 42), and 3) the total amount of the emitted light (dotted line 44) that is collected by the light collector. As shown by the dashed line 40 in FIG. 3, as $\theta$ is increased from 0°, the percentage of light loss decreases, first at a high rate, then at a slower rate. The percentage of flare, as shown by the solid line 42 in FIG. 3, rises slowly for about the first 10°, then increases at a more rapid pace. The percentage of light collected, as shown by the dotted line 44, first increases as $\theta$ is increased from 0, and then decreases after reaching a maximum at about 15°.

According to the present invention, it is desirable to arrange the light collecting face between about 10° and 15° from the vertical, for the best collection efficiency. As can be seen from FIG. 3, a trade-off between collection efficiency and flare can be effected by adjusting the angle $\theta$. Depending upon the particular application, if high collection efficiency is more important than low flare, the angle $\theta$ is adjusted towards 15°. On the other hand, if low flare is more important, the angle is adjusted towards 10°.

Optionally, a further reduction in flare reaching the phosphor sheet as well as a reduction in flare induced emission which is collected can be achieved by providing a mask between the bottom edge of the light collector and the bottom edge of the mirror, defining a slit through which the scanning beam and emitted light may pass. Such a mask 30 is shown in dashed lines in FIGS. 2a–c. Furthermore, an antireflection coating may be applied to the light receiving face 12 of the slab 10 to further reduce flare induced emission.

The response of the light collector along the scan line is easily made uniform by adjusting the individual gains of the photomulitplier tubes 20.

Figure 4:
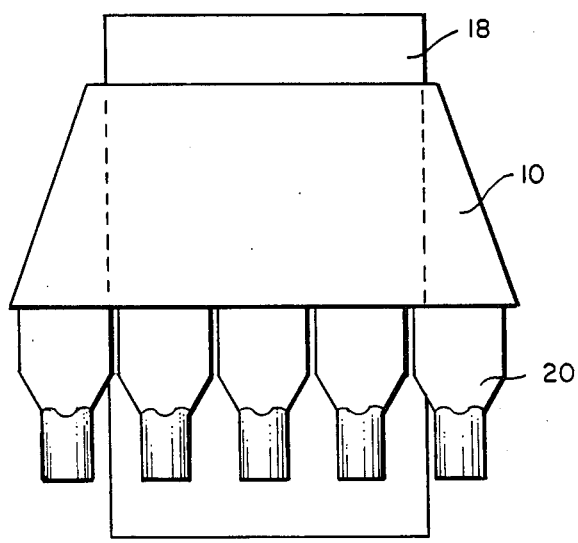
FIG. 4 is a top view of a light collector similar to that shown in FIG. 1, illustrating a further improvement.
Figure 5:
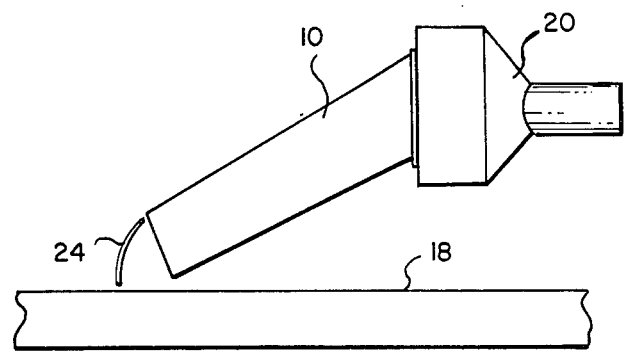
FIG. 5 is a side view of a light collector similar to that shown in FIG. 2, illustrating a further improvement.

According to an alternative embodiment of the invention, the collection efficiency may be further increased by making the slab 10 wider and/or thicker at the edge of the slab adjacent the photomultiplier tubes 20 thereby reducing the average number of reflections and consequently the average path length of collected rays. The reduced path length minimizes absorption losses within the slab 10. FIG. 4 shows a top view of such a collector head that is wider at the edge of the slab adjacent the photomultiplier tubes, and FIG. 5 shows a side view of a light collector wherein the slab 10 is thicker at the edge adjacent the photomultiplier tubes 20.

Industrial Applicability and Advantages

The light collector according to the present invention is useful in x-ray imaging apparatus of the type employing a photostimulable phosphor. The light collector is advantageous in that the light collector exhibits reduced flare and higher collection efficiency than the prior art light collector.

What is claimed is:

1. A light collector for collecting and detecting emitted light from a raster scanned photostimulable phosphor sheet in a photostimulable phosphor image apparatus is characterized by:
   a generally rectangular slab of transparent material having a thickness of greater than 20 mm. a first face of said slab of transparent material being arranged adjacent the scan line on the photostimulable phosphor sheet, said first face making an angle $\theta$ of between 10° and 15° with respect to a perpendicular to the surface of the stimulable phosphor sheet;
   a plurality of photomultiplier tubes arranged in optical contact with an face opposite said first face of said slab of transparent material; and
   an elongated mirror arranged opposite said first face for directing light emitted from said phosphor sheet onto said first face of said slab of transparent material.

2. The light collector claimed in claim 1, wherein said transparent slab is thicher at the face near said photomultiplier tubes, and thinner at the face adjacent the scan line.

3. The light collector claimed in claim 1, wherein said transparent slab is wider at the face adjacent the photomultiplier tubes than the face adjacent the scan line.

4. The light collector claimed in claim 1, further including a mask extending from the bottom edge of the transparent slab nearest said phosphor sheet and from the bottom edge of the elongated mirror, said mask defining a slot for passing a scanning beam to the photostimulable phosphor sheet and for allowing emitted light to enter the light collector.

* * * * *